United States Patent
Isenhour et al.

(10) Patent No.: US 9,880,364 B2
(45) Date of Patent: Jan. 30, 2018

(54) SUBSTRATE MOUNTED OPTICAL RECEPTACLE

(71) Applicant: Corning Optical Communications LLC, Hickory, NC (US)

(72) Inventors: Micah Colen Isenhour, Lincolnton, NC (US); Christopher Paul Lewallen, Hudson, NC (US); James Phillip Luther, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/273,905

(22) Filed: Sep. 23, 2016

(65) Prior Publication Data

US 2017/0010426 A1    Jan. 12, 2017

Related U.S. Application Data

(63) Continuation of application No. PCT/US2015/022896, filed on Mar. 27, 2015.

(60) Provisional application No. 61/975,304, filed on Apr. 4, 2014.

(51) Int. Cl.
*G02B 6/32* (2006.01)
*G02B 6/42* (2006.01)

(52) U.S. Cl.
CPC .......... *G02B 6/4214* (2013.01); *G02B 6/428* (2013.01); *G02B 6/4231* (2013.01); *G02B 6/4292* (2013.01); *G02B 6/4261* (2013.01)

(58) Field of Classification Search
CPC ..... G02B 6/4214; G02B 6/4231; G02B 6/428
USPC ........................................................ 385/33
See application file for complete search history.

(56) References Cited

U.S. PATENT DOCUMENTS

| | | | |
|---|---|---|---|
| 4,824,202 A | 8/1989 | Auras | |
| 5,241,612 A | 8/1993 | Iwama | |
| 6,041,156 A | 3/2000 | Heitmann | |
| 6,213,650 B1 | 4/2001 | Moriyama et al. | |
| 7,097,468 B2 | 8/2006 | Ice | |
| 7,251,398 B2 | 7/2007 | Baets et al. | |

(Continued)

FOREIGN PATENT DOCUMENTS

| | | |
|---|---|---|
| EP | 2581776 A1 | 4/2013 |
| WO | 2013148763 A1 | 10/2013 |

(Continued)

OTHER PUBLICATIONS

Isenhour et al., U.S. Appl. No. 15/229,585, "Optical Bodies Having a Total Internal Reflection Surface and a Short Optical Path Length," filed Aug. 5, 2016.

(Continued)

*Primary Examiner* — Jerry Blevins
(74) *Attorney, Agent, or Firm* — Michael E. Carroll, Jr.

(57) ABSTRACT

Disclosed are optical receptacles for use with electronic devices. In one embodiment, the optical receptacle comprises an optical lens body for receiving and transmitting optical signals and the optical lens body comprising a front face with a recess and a total internal reflection (TIR) surface. A cover is disposed in the recess of the optical lens body for protecting a surface of the optical lens body and also provides a cleanable surface. The optical receptacle also includes a receptacle shell with an open side for housing the optical lens body. and a cover disposed in the recess of the optical lens body.

21 Claims, 5 Drawing Sheets

(56) References Cited

U.S. PATENT DOCUMENTS

| | | |
|---|---|---|
| 8,328,434 B2 | 12/2012 | Wang et al. |
| 8,348,525 B2 | 1/2013 | Wang et al. |
| 8,414,309 B2 | 4/2013 | Meadowcroft et al. |
| 2007/0054553 A1* | 3/2007 | Nishio .................. H01R 13/64 439/607.55 |
| 2007/0249193 A1* | 10/2007 | Penumatcha .......... H01R 43/20 439/125 |
| 2011/0229077 A1 | 9/2011 | Fortusini et al. |
| 2011/0229083 A1 | 9/2011 | Dainese et al. |
| 2011/0249947 A1 | 10/2011 | Wang et al. |
| 2012/0027345 A1 | 2/2012 | Castagna et al. |
| 2012/0155803 A1 | 6/2012 | Benjamin et al. |
| 2012/0189252 A1* | 7/2012 | Bhagavatula ............ G02B 6/32 385/79 |
| 2012/0195556 A1 | 8/2012 | Wang et al. |
| 2012/0266434 A1 | 10/2012 | Yu et al. |
| 2013/0259419 A1 | 10/2013 | Charbonneau-Lefort |
| 2013/0259423 A1 | 10/2013 | Charbonneau-Lefort |
| 2013/0266261 A1 | 10/2013 | Lam et al. |
| 2014/0105543 A1 | 4/2014 | de Jong |
| 2014/0169741 A1* | 6/2014 | Fortusini .................. G02B 6/32 385/52 |
| 2014/0241672 A1 | 8/2014 | Isenhour et al. |
| 2014/0308003 A1 | 10/2014 | Benjamin et al. |

FOREIGN PATENT DOCUMENTS

| | | | |
|---|---|---|---|
| WO | 2013163389 A1 | 10/2013 | |
| WO | WO 2013163389 A1 * | 10/2013 | ........... G02B 6/4293 |

OTHER PUBLICATIONS

Patent Cooperation Treaty, International Search Report for PCT/US2015/22896, dated Jun. 3, 2015, 4 pages.

Patent Cooperation Treaty, International Search Report for PCT/US2015/015577, dated May 5, 2015.

Written Opinion issued in corresponding PCT Appln. No. PCT/US2015/022896, dated Jun. 3, 2015 (5 pgs).

Rules 161(1) and 162 Communication received in corresponding EP Appln. No. 15716299.1, dated Nov. 25, 2016 (8 pgs).

* cited by examiner

SUBSTRATE MOUNTED OPTICAL RECEPTACLE

CROSS-REFERENCE TO RELATED APPLICATIONS

This application is a continuation of International Application No. PCT/US2015/22896, filed on Mar. 27, 2015, which claims the benefit of priority under 35 U.S.C. § 119 of U.S. Provisional Application Ser. No. 61/975,304 filed on Apr. 4, 2014, the content of which is relied upon and incorporated herein by reference in their entirety.

BACKGROUND

The disclosure is directed to optical receptacles that mount to a substrate such as a circuit board for use in electronic devices. More specifically, the disclosure is directed to optical receptacles that mount to a substrate and have an optical body that turns the optical signals.

As electronic devices move toward operation at faster data rates the electrical interfaces on these devices along with the electrical transmission cables will reach their bandwidth capacity limitations. Additionally, the electronic devices are trending to smaller and thinner footprints that are operating at faster speeds.

Consequently, there is an unresolved need for optical interfaces that may be used for relatively small devices like typical consumer applications such personnel devices such as smart phones, tablets and other consumer devices that have a relatively small footprint. The concepts disclosed herein solve this unresolved need for optical interfaces for small form-factor devices.

SUMMARY

The disclosure is directed to optical receptacles that are suitable for use in electronic devices such as smart phones, tablets, laptop computers and other devices. In one embodiment, the optical receptacle comprises an optical lens body for receiving and transmitting optical signals, a receptacle shell and a cover. The optical lens body comprises a front face with a recess and a total internal reflection (TIR) surface, and a cover disposed in the recess of the optical lens body. The receptacle shell comprises an open side and houses the optical lens body.

Another aspect of the application is directed to an optical receptacle comprising an optical lens body for receiving and transmitting optical signals with the optical lens body comprising a front face with a recess and a rear portion, a receptacle shell for housing the optical lens body and the receptacle shell comprising an open side, a circuit board assembly comprising one or more active components and the circuit board assembly being attached to the rear portion of the optical lens body, and a cover disposed in the recess of the optical lens body.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference will now be made in detail to the preferred embodiments of the disclosure, examples of which are illustrated in the accompanying drawings. Whenever possible, like reference numbers will be used to refer to like components or parts.

The optical receptacles disclosed herein enable high-speed data applications for transmitting optical signals to electronic devices such as speeds of 5 GB/sec or greater along with having a relatively small and compact footprints so that they are useful for use with electronic devices such as consumer devices and the like. The optical receptacles disclosed may be a portion of an electronic device so it can receive optical signals for conversion into electrical signals and vice versa for transmitting signals. In order to transmit/receive optical signals, the optical receptacles may include an optical lens body for directing the optical signals to and from one or more active components such as a laser diode, vertical-cavity surface-emitting laser (VCSEL), photo diode or the like. In one embodiment, the optical lens body may include a total internal reflection (TIR) surface for turning the optical signals. Further, optical lens bodies may include one or more lenses disposed at suitable locations. The one or more lenses of the optical lens body are used for collimating or focusing the light from the transmission channel that is optically coupled to a laser or laser diode to an optical fiber in a complementary cable assembly having an optical plug, and from the optical fiber in the complementary cable assembly to a receive channel of the optical receptacle that is optically coupled to an active components such as a photodiode or the like. The optical receptacle may also include a receptacle shell for housing the optical lens body along with a cover disposed in a recess of the optical lens body. In certain embodiments, the optical receptacles have a footprint with a width W that is greater than the height H such as the width W being 3 times or more than height H (e.g., W>3*H), but other suitable dimensions are possible.

For instance, the optical receptacle can have a low-profile height H such as 5 millimeters or less for use in electronic devices that have a thin profile. The optical receptacle may further comprise a circuit board assembly comprising one or more active components. Thus, the one or more active components may be optically aligned with the optical channels of the optical lens body independent of the electronic device, thereby provide an optical receptacle that can be assembled quickly and easier into larger assemblies of the electronic device such as mounted to a substrate without further optical alignment procedures or processes that may otherwise complicate assembly and manufacturing cycle times. Consequently, the optical receptacle provides quick and easy manufacturing with a footprint that is advantageous for use with electronic devices having thin and compact profiles and the like.

Figure 1:
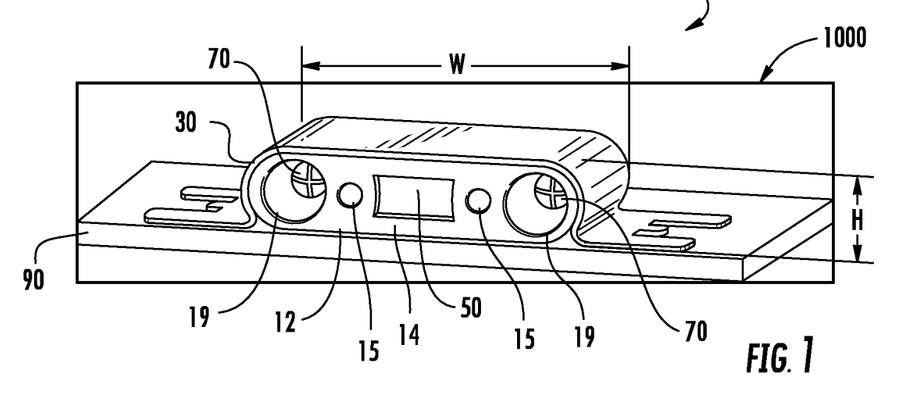
FIG. 1 is a perspective view of an explanatory optical receptacle according to the concepts disclosed herein.
Figure 2:
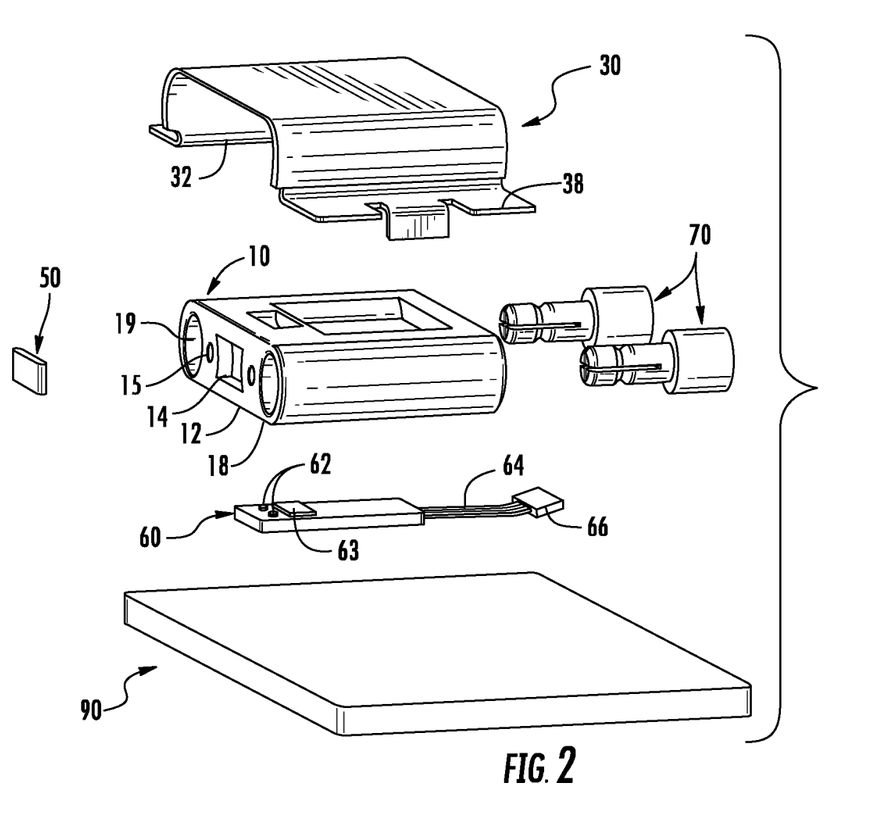
FIG. 2 is a partially exploded view of the optical receptacle of FIG. 1.

FIGS. 1 and 2 respectively are a perspective view and a partially exploded view of an explanatory optical receptacle 100 according to the concepts disclosed. Optical receptacle 100 may be a portion of an electronic device 1000 as represented by the rectangle box shown in FIG. 1. By way of example, the electronic device 1000 may be a smart phone, PDA, laptop, tablet or the like.

The optical receptacle 100 shown comprises an optical lens body 10 for receiving and transmitting optical signals, a receptacle shell 30 for housing the optical lens body 10, and a cover 50. Optical lens body 10 comprises a front face 12 having a recess 14. Recess 14 is sized for receiving and securing cover 50 so that it generally has a flush mount with the front face 12 of optical lens body 10 as best shown in FIG. 5. The cover 50 is disposed in the recess 14 of the optical lens body 10 and protects surfaces such as lens as the front portion of the optical lens body 10 from dirt and debris. Moreover, the cover 50 provides a surface that is easy to wipe clean and may include one or more coatings. In this embodiment, optical lens body 10 has a plurality of optical channels that also include a TIR surface 17 (FIGS. 3 and 4) for turning the optical signals as discussed herein.

As shown in FIG. 2, optical receptacle 100 may also include a circuit board assembly 60 that is attached to the optical lens body 10. Circuit board assembly 60 may include one or more active components 62. Active components 62 include opto-electrical components such as photodiodes, laser diodes, VCSEL and the like and are used for respectively receiving and transmitting optical signals from optical lens body 10. Circuit board assembly 60 may also include other components such as integrated circuits (ICs) 63 and the like. ICs 63 may be components such as laser drivers, retiming circuits and the like for supporting the electrical-to-optical and optical-to-electrical conversions. The active components 62 and ICs 63 may be electrically attached and/or mounted to the circuit board 12 in any suitable manner such as directly onto the circuit board depending the specifics of the design. Circuit board assembly 60 may also include an electrical tether 64 and an electrical connector 66. The electrical tether 64 and electrical connector 66 advantageous allow the circuit board assembly 60 to be tested for operation prior to assembly with the optical lens body 10 by plugging in the electrical connector to a test-setup to determine proper operation as desired.

The optical receptacle 100 is disposed on a substrate 90 such as a circuit board. Receptacle shell 30 has an open side 32 as depicted in FIG. 2 and the open side 32 faces the substrate 90 when mounted. Receptacle shell 30 may also include flanges 38 on the outboard sides for securing it to substrate 90 in a suitable manner. Flanges 38 may be soldered to the circuit board assembly for grounding the receptacle shell 30 if desired. Further, the optical receptacle 100 may be placed onto the substrate 90 as a unit at the desired time in the manufacturing process and be electrically connected to the electronic device 1000 such as by connecting electrical connector 66.

During assembly of optical receptacle 100, the circuit board assembly 60 can be aligned to the optical lens body 10 so that the one or more active components 62 are aligned with one or more lens 13 disposed the optical lens body 10. As desired, the alignment may be an active and/or passive alignment of the active components 62 to a plurality of lenses 13 disposed on a bottom portion of the optical lens body 10. For instance, a vision alignment system may be used and/or the positioning may use alignment features and fiducials for the optical alignment. One or more lenses 13 on bottom portion 18 of optical lens body 10 are used for collimating or focusing the optical signals from the transmit channel like a laser diode or VCSEL, and into the receive channel such as a photodiode. Optical lens body 10 may have other lenses as desired.

In this embodiment, the circuit board assembly 60 is attached to a bottom portion 18 of the optical lens body 10. Specifically, optical lens body 10 includes a ledge (not numbered) as visible in FIG. 5 on the bottom portion 18 for seating and attaching the circuit board assembly 60. The ledge may be formed to secure a perimeter portion of the circuit board assembly 60 or even the entire perimeter for inhibiting dust or debris from impacting the optical pathway. Attaching the circuit board assembly to the optical lens body 10 is advantageous over conventional optical receptacle designs since the circuit board assembly 60 is attached to the optical lens body 10 as a unit. Consequently, stresses on and/or movement of the optical lens body 10 is inhibited from disrupting the optical alignment of the optical lens body 10 and the active components 62 on the circuit board assembly 60 since they will tend to move together.

Figure 3:
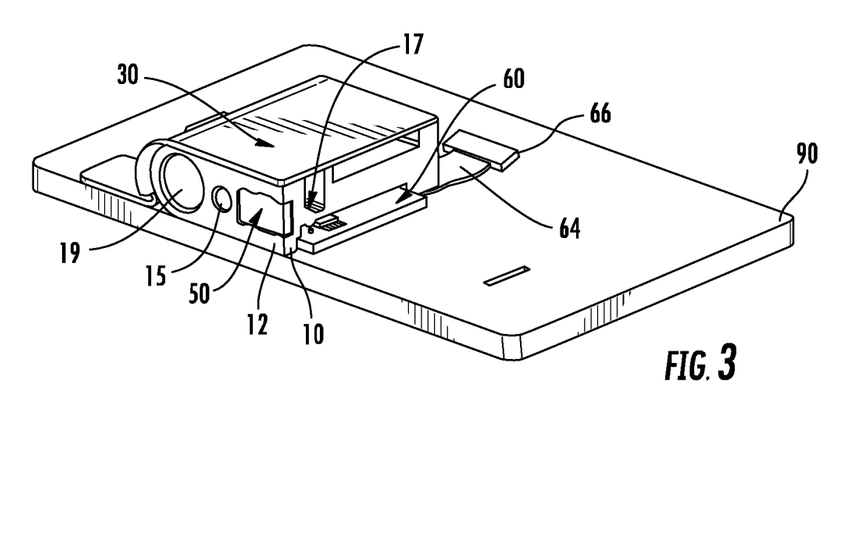
FIG. 3 is a cross-sectional view of the optical receptacle of FIGS. 1 and 2.
Figure 4:
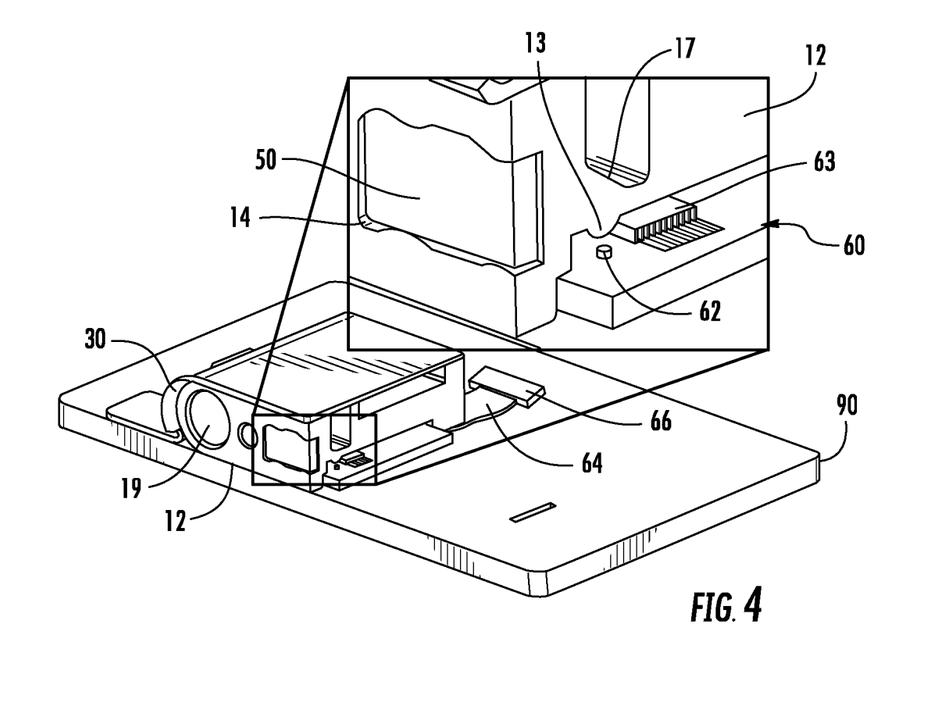
FIG. 4 is a close-up cross-sectional view of the optical receptacle of FIG. 3.
Figure 5:
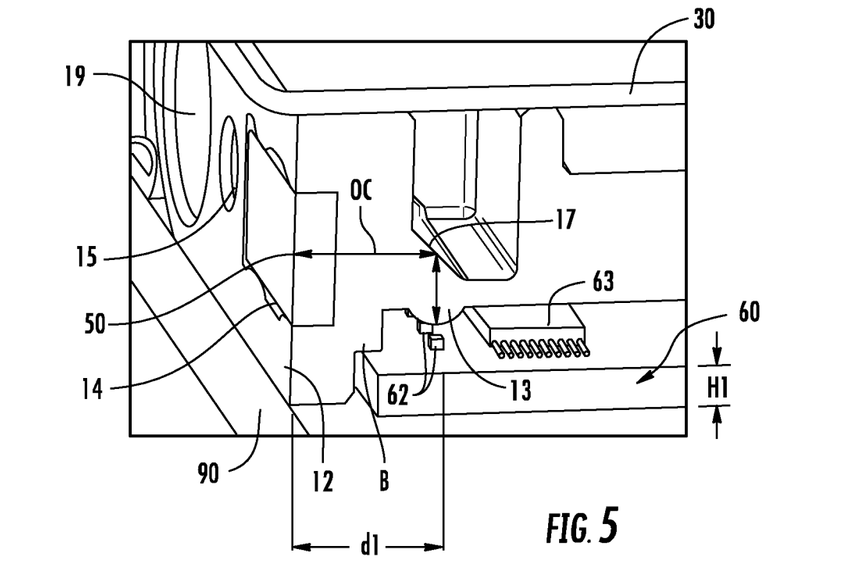
FIG. 5 is a partial cross-sectional view showing the optical path of the optical lens body for the optical receptacle of FIG. 3.
Figure 7:
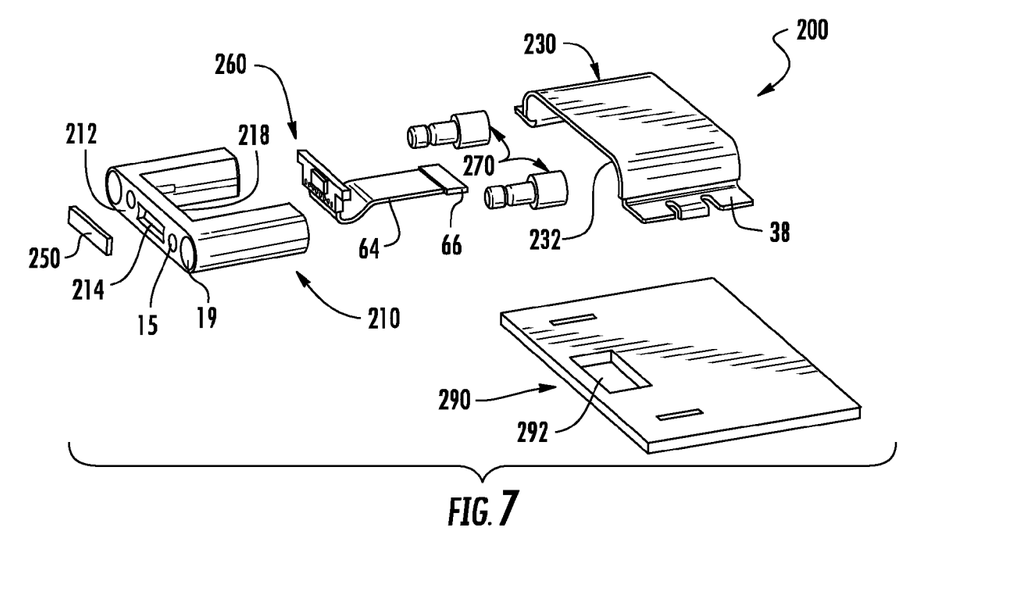
FIG. 7 is a partially exploded view of another optical receptacle of FIG. 1 according to the concepts disclosed herein.

FIGS. 3 and 4 are cross-section views of the optical receptacle 100 showing the detailed construction of the same. Optical lens body 10 turns the optical signals toward the active optical components 62 disposed on circuit board assembly 60 on the receive channels and turns the optical signals toward the front face 12 on the transmit channels. Specifically, the optical lens body 10 comprises TIR surface 17 formed in the molded part for aligning optical paths of a mating interface of the optical lens body 10 with active optical components 62 on the circuit board assembly 60 and coupling the light signal to and from these active components 62. Stated another way, the active components 62 are aligned with the desired portions of the optical lens body such as lenses 13 for creating transmit and receive channels and directing optical signals to and from the optical receptacle mating interface. TIR surface 17 creates an optical turn by forming a surface that acts like a mirror to turn the optical signals about 90 degrees (i.e., turn the light in a folded pathway), thereby allowing a relatively small form factor for the optical receptacle since the active components may be located on a circuit board assembly that is not aligned with the receptacle/plug insertion direction. The TIR surface 17 is an interface between two different materials that reflects the light because the interface such as between air and the polymer material of the optical lens body 10 module have two different indexes of refraction, thereby causing the optical signal to reflect off of the TIR surface 17 and change the direction of the light by reflecting internally within the optical lens body 10. However, the concepts disclosed herein may also be used with optical lens bodies that do not turn the optical signals, but instead pass the optical signals in-line (e.g., straight through) to the active components such as depicted in FIG. 7. For instance, the active components may be mounted on a circuit board assembly that is attached to a vertical or back surface of the optical lens body instead of being attached to a horizontal surface such as the bottom of the optical lens body.

As shown, optical receptacle 100 optionally has a plurality of electrical contacts 70 disposed therein for making electrical connections when mated with a complimentary optical plug. The one or more electrical contacts may be used for transmitting electrical signals, power or the like. If used, the optical lens body 10 may include one or more bores 19 that extend to the front face 14 of the optical lens body 10 as shown. Further, the bores 19 may extend from the front face 14 to a rear face (not numbered) of the optical lens body 10 if desired or they may be a blind bore depending on the design. In this embodiment, the optical lens body 10 has a first bore 19 with a first electrical contact 70 disposed therein. Likewise, the optical lens body 10 has a second bore 19 with a second electrical contact 70 disposed therein. Further, the first and second bores 19 are disposed on opposite sides of cover 50 as shown.

Although, the first and second electrical contacts 70 shown in this embodiment are pin-type electrical contacts, the electrical contacts may have any suitable configuration as desired such as wiping contacts or spring contacts and the optical lens body 10 may be modified as needed for the given electrical contact configuration. However, other embodiments of optical receptacles may have still other configurations for the electrical or optical interfaces if desired.

The optical receptacle 100 may also have one or more optional alignment features 15 at the front face 14 of optical lens body 10. In this embodiment, alignment features 15 are guide pin bores (i.e., the smaller bores inboard of bores 19) disposed outward of the cover 50. Alignment features 15 are used for providing alignment with a complimentary optical plug 5 (FIG. 6) such as guide pins disposed on the optical plug 5. However, the bores 19 may also be used for providing gross alignment with the complimentary optical plug instead of guide pins.

Optical lens body 10 may have any suitable configuration for optical transmission of signals. By way of example, the optical lens body 10 may have lenses that are integrally formed behind the cover 50 adjacent to the mating surface of the optical receptacle. In other embodiments, the optical lens body may include a plurality of gradient index fiber (GRIN) lenses, optical fibers or the like disposed within the optical lens body for channeling light signals to/from the active devices of the circuit board assembly. For instance, the optical lens body may has four waveguide bores for receiving the gradient index fiber (GRIN) lenses, optical fibers or the like in bores for channeling optical (i.e., light) signals. Other variations of the optical lens body may have any suitable number of optical channels such as two, six eight, etc.

FIG. 5 is a close-up cross-sectional view of the optical channel OC of the optical lens body 10. Optical lens body comprises a front face, a top and a bottom, and at least one optical channel comprising a total internal reflection (TIR) surface and a lens. The lens is located on the bottom and is a distance of 500 microns or less from the front face (e.g., front end); however, other suitable distances are possible. The optical body further comprises a cover adjacent to the front end, and a circuit board assembly having at least one active component, wherein the circuit board assembly is attached to the optical lens body so the at least one active component of the circuit board assembly is aligned with the lens.

Lens 13 is located on the bottom portion 18 of optical lens body 10 and is located a distance d1 of 500 microns of less from the front face 14. Thus, the optical channel OC path length of optical lens body 10 may be relatively short compared with conventional optical bodies. Consequently, the optical lens bodies disclosed herein may inhibit optical beam walk-off from the desired target area compared with the conventional optical bodies. As shown, the total optical channel OC path length of optical lens body 10 includes a horizontal component and a vertical component. Further, the distance d1 may have any suitable value from the front face 14 to maintain a relatively short optical path length for the optical path length. As an example, the distance d1 may be 300 microns or less from the front face 14. In other embodiments, the optical lens bodies can have more lenses at other locations as desired such as adjacent to the front face. The optical lens body 10 is formed from a suitable material for transmitting optical signals at the desired wavelength. As an example, the optical lens body 10 may be formed from LEXAN® or other suitable material. Although only one lens 13 is visible in the cross-section of FIG. 5, the optical body 10 may have a plurality of lenses and a plurality of optical channels such as transmit and receive optical channels. Further, the path lengths of the transmit and receive optical channels OC may have the same or different path lengths depending on the desired optical prescription of the design. Similar designs of optical lens bodies 10 are disclosed in further detail in U.S. Pat. App. Ser. No. 61/940,654 filed on Feb. 17, 2014 and are suitable with the concepts disclosed herein, the contents of which are incorporated herein by reference.

Figure 6:
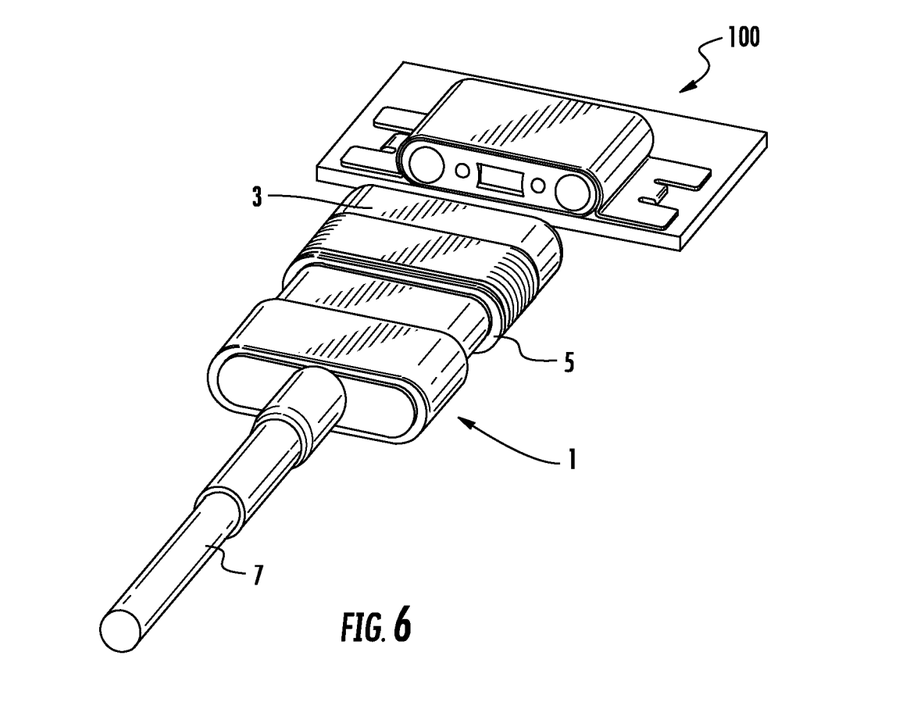
FIG. 6 is a perspective view showing an optical plug being aligned with the optical receptacle of FIG. 1 for mating.

FIG. 6 is a perspective view of a cable assembly 1 having an optical plug 5 being aligned with optical receptacle 100. Cable assembly 1 includes a fiber optic cable 7 having optical plug 5 attached thereto with a cover 3 that translates during mating. When the optical plug 5 is mated with the optical receptacle the respective optical channels are aligned so that optical signals may be transmitted therebetween. The cover of optical plug 5 protects the lenses or optical channels of the optical plug 5 from dirt and debris and allows access for easy cleaning of the cover (e.g., accessible for wiping) and/or replacing of the cover if desired or necessary to due to damage. Moreover, the cover 3 of the optical plug 5 translates from a forward position to a retracted position, but unlike other connector designs the optical interface does not appreciably translate in the Z-direction and instead may "float" to a small degree for optical alignment. Thus, because the concepts disclosed do not require translation of the optical portion like conventional designs, the issues with optical alignment and/or optical fiber movement with the optical portion are inhibited. Additionally, the optical plug connector is a robust and reliable design for applications that are expected to experience large number of mating/unmating cycles such as consumer electronic applications. Cable assembly 1 and optical plug 5 and similar designs are disclosed in further detail in U.S. Pat. App. Ser. No. 61/839, 172 filed on Jun. 25, 2013, the contents of which are incorporated herein by reference.

Figure 8:
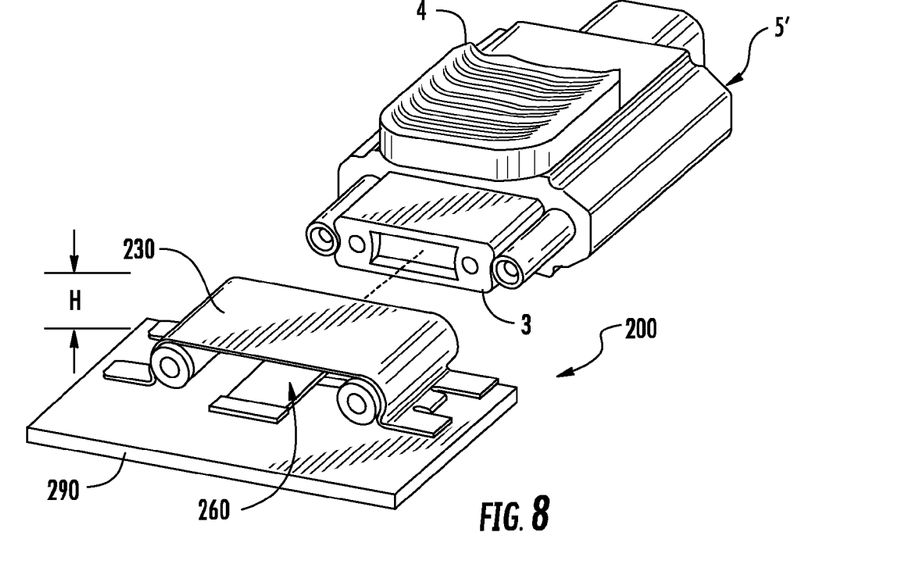
FIG. 8 is a perspective view showing an optical plug being aligned with the optical receptacle of FIG. 7.
Figure 9:
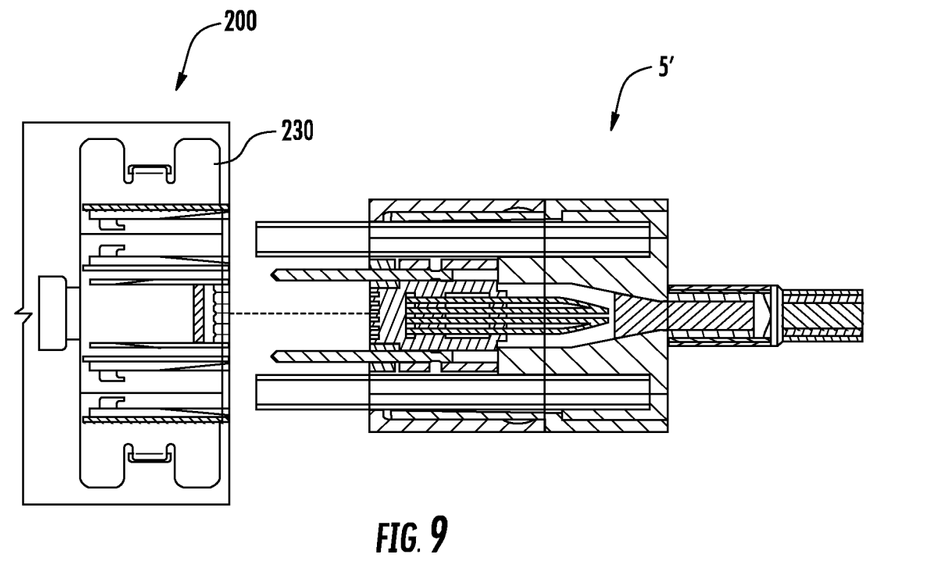
FIG. 9 is a cross-sectional view of the optical plug and optical receptacle being aligned before mating.

Still other variations are possible for the optical receptacle using the concepts disclosed. Instead of an optical lens block performing an optical turn, the optical lens block may perform an electrical turn. FIGS. 7-9 are perspective views showing optical receptacle 200 that has some similarities to optical receptacle 100, but has a different arrangement of a circuit board assembly 260 and optical lens body 210. As shown in FIG. 7, optical receptacle 200 comprises an optical lens body 210 for receiving and transmitting optical signals, a receptacle shell 230 for housing the optical lens body 210, and a cover 250. Optical lens body 210 comprises a front face 212 having a recess 214. Recess 214 is sized for receiving and securing cover 250 so that it generally has a flush mount with the front face 212 of optical lens body 210. The cover 250 is disposed in the recess 214 of the optical lens body 210 and protects surfaces such as lens as the front portion of the optical lens body 210 from dirt and debris. Moreover, the cover 250 provides a surface that is easy to wipe clean and may include one or more coatings. In this embodiment, optical lens body 210 has a plurality of optical channels, but unlike optical lens body 10 it does not include a TIR surface 17 for turning the optical signals; but, instead passes the optical signals in-line to active components 62 on circuit board assembly 260. The differences in the optical receptacle 200 compared with optical receptacle 100 are discussed below.

Optical receptacle 200 may also include a circuit board assembly 260 that is attached to the optical lens body 210; however, it is not attached to a bottom portion, but instead it is attached to a rear portion 218 of optical lens body 210. Circuit board assembly 260 is otherwise similar to circuit board assembly 60 since it may include one or more active components 62 along with ICs 63. Active components 62 include opto-electrical components such as photodiodes, laser diodes, VCSEL and the like and ICs 63 may be components such as laser drivers, retiming circuits and the like for supporting the electrical-to-optical and optical-to-electrical conversions. Circuit board assembly 260 may also include an electrical tether 64 and an electrical connector 66.

As shown in FIG. 8, the optical receptacle 200 is disposed on a substrate 290 such as a circuit board. Substrate 290 may also include a cutout 292 for allowing a suitable routing of electrical tether 64 as is bends from a vertical position to more of a horizontal position due to the mounting of circuit board assembly 260 on optical lens block 210. The optional cutout 292 allows for a larger bend radius of the electrical tether 64. Like receptacle shell 30, receptacle shell 230 has an open side 232 as depicted and the open side 232 faces the substrate 290 when mounted. Receptacle shell 230 may also include flanges 38 on the outboard sides for securing it to substrate 290 in a suitable manner.

During assembly of optical receptacle 200, the circuit board assembly 260 can be aligned to the optical lens body 210 so that the one or more active components 62 are aligned with one or more lens (not visible) disposed the optical lens body 210. As desired, the alignment may be an active and/or passive alignment of the active components 62 to a plurality of lenses disposed on the rear portion 218 of the optical lens body 210. For instance, a vision alignment system may be used and/or the positioning may use alignment features and fiducials for the optical alignment. One or more lenses on rear portion 218 of optical lens body 210 are used for collimating or focusing the optical signals from the transmit channel like a laser diode or VCSEL, and into the receive channel such as a photodiode. Optical lens body 210 may have other lenses as desired.

In this embodiment, the circuit board assembly 60 is attached to rear portion 218 of the optical lens body 210. Specifically, optical lens body 210 includes a ledge (not visible) at the rear portion 218 for seating and attaching the circuit board assembly 260. Attaching the circuit board assembly 260 to the optical lens body 210 is advantageous over conventional optical receptacle designs since the circuit board assembly 260 is attached to the optical lens body 210 as a unit. Consequently, stresses on and/or movement of the optical lens body 210 is inhibited from disrupting the optical alignment of the optical lens body 210 and the active components 62 on the circuit board assembly 260 since they will tend to move together.

Optical plug 5' is similar to optical plug 5, except that cover 3 is manually moved by an actuator 4 instead of being biased by springs. FIG. 9 is a cross-sectional view of optical receptacle 200 and optical plug 5'.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An optical receptacle, comprising:
   an optical lens body for receiving and transmitting optical signals, the optical lens body comprising:
   a front face with a recess and a total internal reflection (TIR) surface;
   a first bore with a first electrical contact disposed within the first bore;
   a second bore with a second electrical contact disposed within the second bore;
   a first guide pin bore feature at the front face disposed between the first bore and the recess; and
   a second guide pin bore feature at the front face disposed between the second bore and the recess;
   a receptacle shell for housing the optical lens body, the receptacle shell comprising an open side configured to face a substrate when mounted to the substrate; and
   a cover disposed in the recess of the optical lens body.

2. The optical receptacle of claim 1, further comprising a circuit board assembly attached to the optical lens body, the circuit board assembly comprising one or more active components.

3. The optical receptacle of claim 2, the circuit board assembly being attached to a bottom portion of the optical lens body.

4. The optical receptacle of claim 3, the circuit board assembly being aligned to the optical lens body so that the one or more active components are aligned with one or more lens disposed on the bottom portion of the optical lens body.

5. The optical receptacle of claim 2, the circuit board assembly further comprising an electrical tether and an electrical connector.

6. The optical receptacle of claim 1, the first electrical contact being a pin-type electrical contact and the second electrical contact being a pin-type electrical contact.

7. The optical receptacle of claim 1, the optical lens body comprising one or more alignment features at the front face.

8. The optical receptacle of claim 1 having a height of 5 millimeters or less.

9. The optical receptacle of claim 1 being mounted on the substrate.

10. The optical receptacle of claim 1 being a portion of an electronic device.

11. The optical receptacle of claim 1, wherein the first guide pin bore and the second guide pin bore are smaller than the first bore and the second bore.

12. An optical receptacle, comprising:
an optical lens body for receiving and transmitting optical signals, the optical lens body comprising:
a front face with a recess and a rear portion;
a first bore with a first electrical contact disposed within the first bore;
a second bore with a second electrical contact disposed within the second bore;
a first guide pin bore feature at the front face disposed between the first bore and the recess; and
a second guide pin bore feature at the front face disposed between the second bore and the recess;
a receptacle shell for housing the optical lens body, the receptacle shell comprising an open side configured to face a substrate when mounted to the substrate;
a circuit board assembly comprising one or more active components, the circuit board assembly being attached to the rear portion of the optical lens body; and
a cover disposed in the recess of the optical lens body.

13. The optical receptacle of claim 12, the circuit board assembly being aligned to the optical lens body so that the one or more active components are aligned with one or more lens disposed on the rear portion of the optical lens body.

14. The optical receptacle of claim 12, the circuit board assembly further comprising an electrical tether and an electrical connector.

15. The optical receptacle of claim 12, the first electrical contact being a pin-type electrical contact and the second electrical contact being a pin-type electrical contact.

16. The optical receptacle of claim 12, the optical lens body comprising one or more alignment features at the front face.

17. The optical receptacle of claim 12 having a height of 5 millimeters or less.

18. The optical receptacle of claim 12 being mounted on the substrate.

19. The optical receptacle of claim 18, wherein:
the circuit board assembly further comprising an electrical tether and an electrical connector; and
the substrate comprising a cutout for routing the electrical tether.

20. The optical receptacle of claim 12 being a portion of an electronic device.

21. The optical receptacle of claim 12, wherein the first guide pin bore and the second guide pin bore are smaller than the first bore and the second bore.

* * * * *